(12) United States Patent
Khanna

(10) Patent No.: US 11,383,777 B2
(45) Date of Patent: Jul. 12, 2022

(54) SCOOTER AUXILIARY WHEEL SYSTEM AND METHOD OF USE

(71) Applicant: Honda Motor Co., Ltd., Tokyo (JP)

(72) Inventor: Rahul Khanna, Mountain View, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 224 days.

(21) Appl. No.: 16/599,801

(22) Filed: Oct. 11, 2019

(65) Prior Publication Data

US 2021/0107578 A1    Apr. 15, 2021

(51) Int. Cl.
| | |
|---|---|
| *B62H 1/12* | (2006.01) |
| *B62H 1/06* | (2006.01) |
| *B62K 3/00* | (2006.01) |
| *B62K 25/04* | (2006.01) |
| *G01S 19/42* | (2010.01) |
| *B62J 45/415* | (2020.01) |

(52) U.S. Cl.
CPC .......... *B62H 1/12* (2013.01); *B62H 1/06* (2013.01); *B62K 3/002* (2013.01); *B62K 25/04* (2013.01); *G01S 19/42* (2013.01); *B62J 45/4151* (2020.02); *B62K 2202/00* (2013.01)

(58) Field of Classification Search
CPC ... G62H 1/12; B62H 1/06; B62H 1/12; B62K 3/002; B62K 25/04; B62K 2202/00; B62K 2015/005; G01S 19/42; B62J 45/4151

See application file for complete search history.

(56) References Cited

U.S. PATENT DOCUMENTS

| | | | |
|---|---|---|---|
| 5,169,165 A | 12/1992 | Oates | |
| 5,257,671 A * | 11/1993 | Watkins | B62D 61/02 180/209 |
| 5,401,055 A * | 3/1995 | Pham | B62D 61/02 180/209 |
| 5,904,218 A * | 5/1999 | Watkins | B62K 11/10 180/209 |
| 7,641,213 B1 * | 1/2010 | Chen | B62H 1/12 280/301 |

(Continued)

FOREIGN PATENT DOCUMENTS

| | | |
|---|---|---|
| CN | 201395224 | 2/2010 |
| CN | 203727570 | 7/2014 |

(Continued)

*Primary Examiner* — James A Shriver, II
*Assistant Examiner* — Michael T. Walsh
(74) *Attorney, Agent, or Firm* — Rankin, Hill & Clark LLP

(57) ABSTRACT

An auxiliary wheel system for a scooter includes an auxiliary wheel, an arm, an drive assembly, and an operation module. The arm has a first end fixed to the auxiliary wheel, and a second end pivotally fixed to a frame of the scooter via a joint attached at the second end. The drive assembly is configured to pivot the arm about the joint between a raised position and a lowered position with respect to the frame wherein the auxiliary wheel is vertically offset from a ground surface and in the lowered position. The operation module is configured to cause the arm to pivot about the joint between the raised position and the lowered position based on a tilt of the frame with respect to the ground surface exceeding a threshold value.

13 Claims, 8 Drawing Sheets

(56) References Cited

U.S. PATENT DOCUMENTS

| | | | | |
|---|---|---|---|---|
| 2004/0195794 | A1* | 10/2004 | Fan | B62H 1/12 |
| | | | | 280/87.01 |
| 2007/0057482 | A1* | 3/2007 | Hsu | B62K 15/008 |
| | | | | 280/278 |
| 2007/0216122 | A1* | 9/2007 | Cornelius | A61H 3/04 |
| | | | | 280/87.05 |
| 2008/0029994 | A1* | 2/2008 | Lytle | B62H 1/12 |
| | | | | 280/293 |
| 2009/0315310 | A1* | 12/2009 | Fan | B62H 1/12 |
| | | | | 280/765.1 |
| 2011/0209932 | A1* | 9/2011 | Takenaka | B62H 1/12 |
| | | | | 180/21 |
| 2011/0231085 | A1* | 9/2011 | Kim | B60L 50/66 |
| | | | | 701/124 |
| 2012/0181765 | A1* | 7/2012 | Hill | B62K 5/027 |
| | | | | 280/62 |
| 2016/0184676 | A1* | 6/2016 | Murabe | A63B 55/60 |
| | | | | 180/216 |
| 2019/0061800 | A1* | 2/2019 | Carrig | B62B 13/08 |
| 2019/0144058 | A1* | 5/2019 | Privitelli | B62H 1/04 |
| | | | | 280/302 |
| 2019/0185088 | A1* | 6/2019 | Kilroy, IV | B62H 1/12 |
| 2021/0179214 | A1* | 6/2021 | Sela | B62K 15/00 |

FOREIGN PATENT DOCUMENTS

| | | | | |
|---|---|---|---|---|
| CN | 204223024 | | 3/2015 | |
| CN | 206501955 | | 9/2017 | |
| CN | 207683695 | | 8/2018 | |
| DE | 102016005678 A1 * | | 11/2017 | B62H 1/10 |
| EP | 3326893 A1 * | | 5/2018 | B62H 1/06 |
| JP | 2019527160 A * | | 9/2019 | |
| KR | 101976608 | | 5/2019 | |
| WO | 201772712 | | 5/2017 | |

* cited by examiner

SCOOTER AUXILIARY WHEEL SYSTEM AND METHOD OF USE

BACKGROUND

Static training wheels which are rigid with respect to a scooter are typically effective in preventing the scooter from tilting over by rigidly maintaining the scooter in an upright position, i.e. preventing the scooter from tilting at all by being constantly deployed. However, because scooters are often maneuvered to incorporate a tilt during normal use, such as leaning into a turn, static training wheels that are effective to prevent the scooter from tilting over also prevent the scooter from functioning normally, and are commonly found obstructive by users. As a result, conventional training wheel systems lack the ability to prevent the scooter from tilting over without inhibiting normal use of the scooter.

Furthermore, motorized scooters, when discarded in a tilted over position by a user, further lack the ability to stand back up and travel autonomously to a favorable location for availability. In view of the popularity motorized scooters have taken in rental business models, motorized scooters belonging to a fleet of individually rentable scooters face the additional challenge of maintaining availability. Once discarded by a user after use in a public space, these scooters often accumulate with other redundant scooters of the same fleet as opposed to occupying areas having no scooters available to potential customers. Beyond being potentially underutilized capital, discarded rental scooters are often considered a nuisance when an accumulation reaches a large, unwieldly number. However, conventional motorized scooters lack the ability to autonomously stand back up and travel, thereby dispersing autonomously.

BRIEF DESCRIPTION

According to one aspect, an auxiliary wheel system for a scooter includes an auxiliary wheel, an arm, a drive assembly, and an operation module. The arm has a first end fixed to the auxiliary wheel, and a second end pivotally fixed to a frame of the scooter via a joint attached at the second end. The drive assembly is configured to pivot the arm about the joint between a raised position and a lowered position with respect to the frame wherein the auxiliary wheel is vertically offset from a ground surface and in the lowered position. The operation module is configured to cause the arm to pivot about the joint between the raised position and the lowered position based on a tilt of the frame with respect to the ground surface exceeding a threshold value.

According to another aspect, a method of operating an auxiliary wheel system for a scooter includes receiving an instruction including a destination for the scooter, determining a current position of the scooter, and setting a traveling route for the scooter based on the current position of the scooter and the destination. The method also includes collecting orientation information describing an orientation of a frame of the scooter, including orientation information indicative of the scooter tilting or being in a non-standing orientation with respect to a ground surface. The method also includes causing the scooter to travel the route and compare a tilt of the frame based on the orientation information with a threshold value, and selectively actuating an arm based on the comparison.

According to another aspect, an auxiliary wheel system for a scooter includes a scooter, an arm attached to a frame of the scooter, and a drive assembly operatively connected to the arm and configured to actuate the arm between a raised position and a lowered position with respect to the frame based on a comparison of an orientation of the frame with respect to a ground surface with a threshold value.

DETAILED DESCRIPTION

I. Definitions

Figure 1:
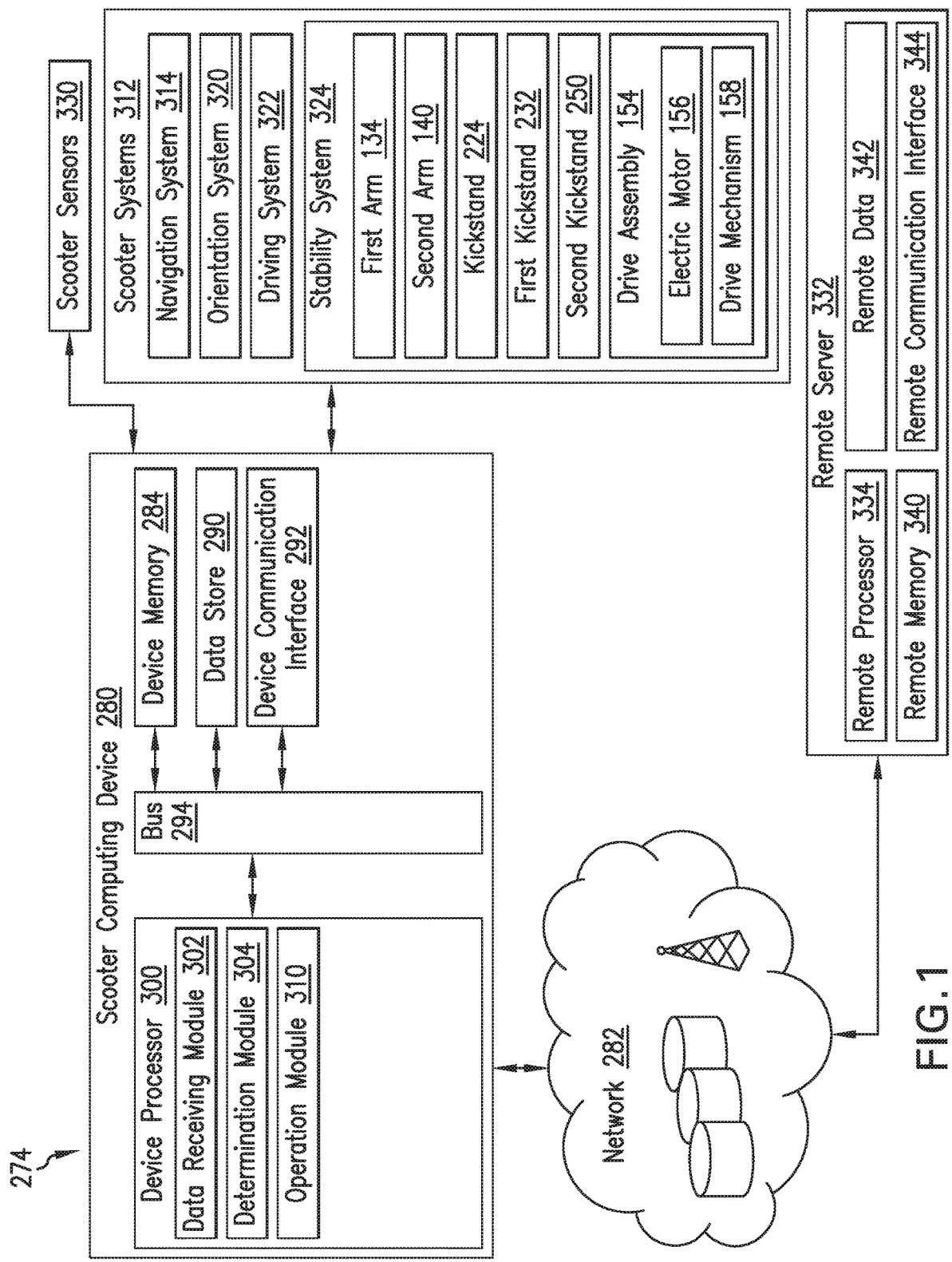
FIG. 1 is a schematic diagram of an operating environment for implementing systems and methods to control scooter systems according to an exemplary embodiment.

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, and a mobile ad hoc network. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling various vehicle components, systems, and subsystems. The term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads, or plug and play devices.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, computer instructions, processor instructions, messages, a bit, a bit stream, that can be received, transmitted and/or detected. The processor can be a variety of various processors including multiple single and multicore processors and co-processors and other multiple single and multicore processor and co-processor architectures. The processor can include logic circuitry to execute actions and/or algorithms.

A "user," as used herein can include, but is not limited to, one or more persons located in the scooter. The scooter occupant can be a driver or a passenger of the scooter. The scooter occupant can be a human (e.g., an adult, a child, an infant).

II. System Overview

Figure 2:
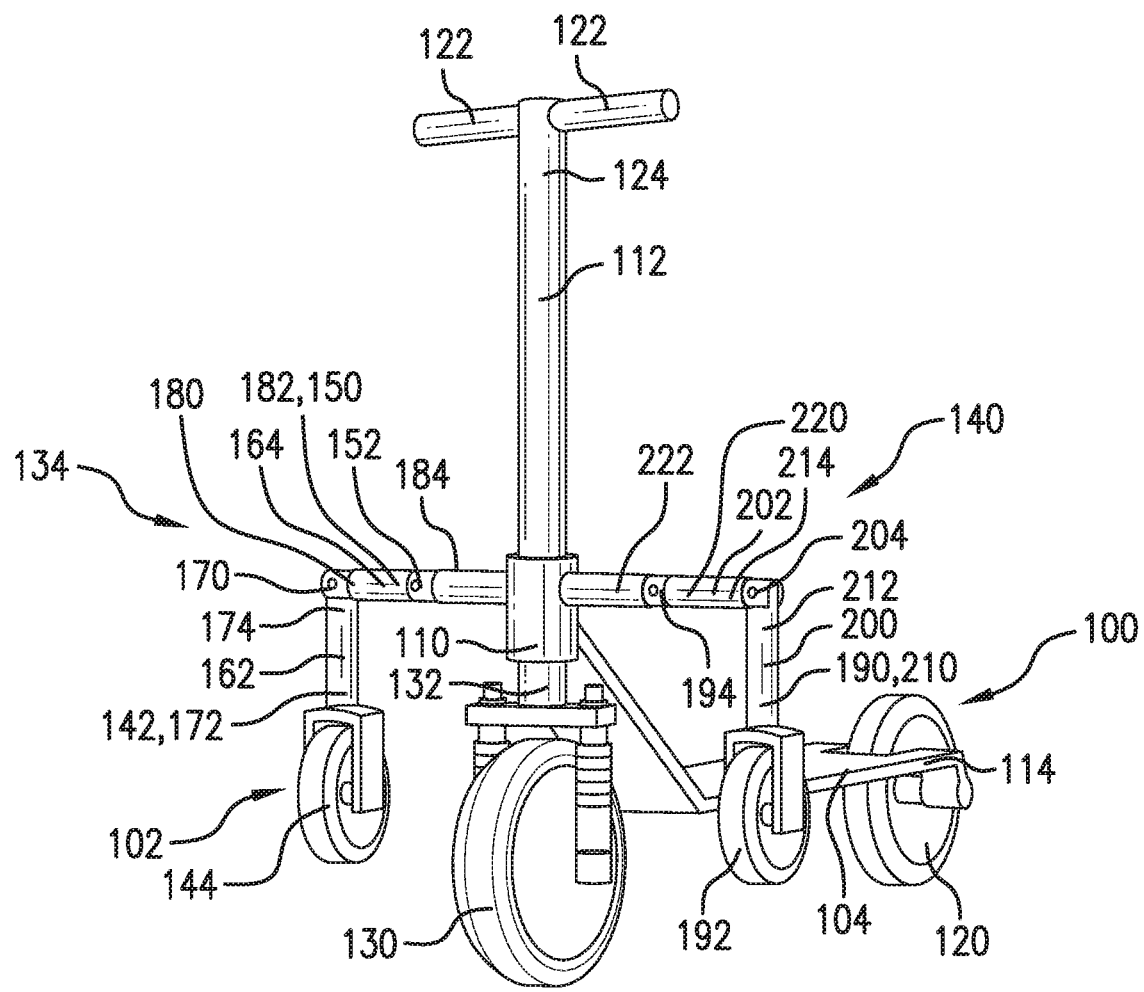
FIG. 2 is a perspective view of an exemplary auxiliary wheel system and an associated scooter.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 2 depicts a scooter 100 with an auxiliary wheel system 102, the scooter 100 including a frame 104 having a forward end 110 fixed to a steering column 112 and a rear end 114 fixed to a rear wheel 120. The steering column 112 features handles 122 on a first end 124 of the steering column 112 configured for being gripped by a user and maneuvered to rotate the steering column 112 with respect to the frame 104, thereby rotating a forward wheel 130 fixed to a second end 132 of the steering column 112 with respect to the rear wheel 120.

As depicted, the auxiliary wheel system 102 includes a first arm 134 and a second arm 140 extending laterally from the scooter 100 in opposing directions normal to a longitudinal direction of the frame 104. Specifically, the first arm 134 and the second arm 140 are attached to the forward end 110 of the frame 104 adjacent the forward wheel 130 and steering column 112, and in this manner the first arm 134, the second arm 140, the forward wheel 130, and steering column 112 share a longitudinal position with respect to the frame 104.

Figure 3:
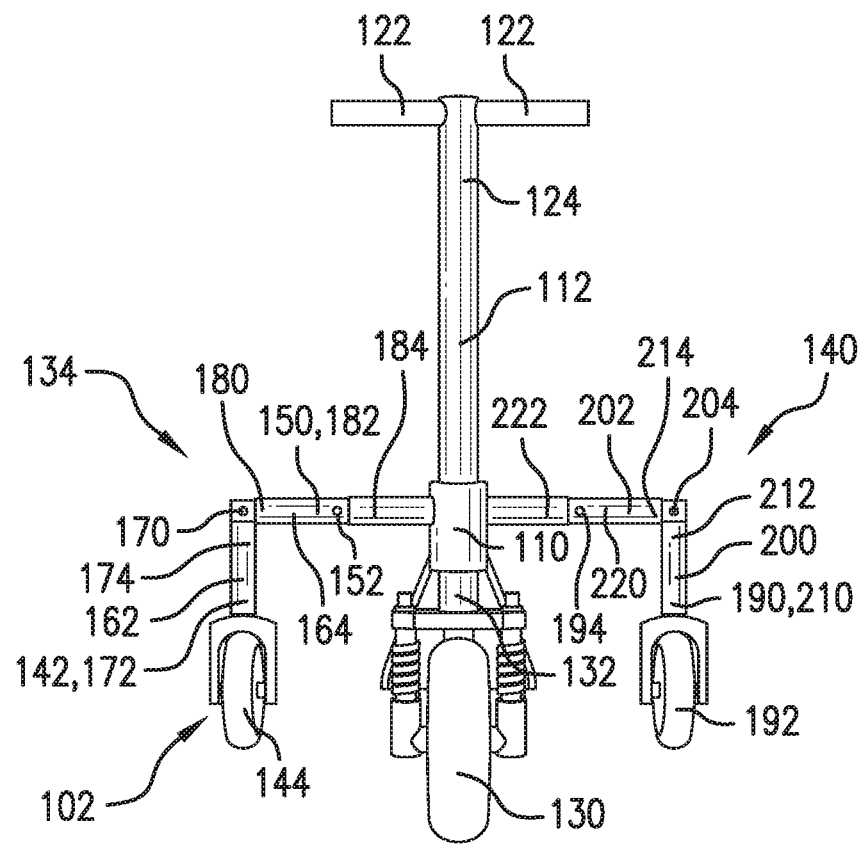
FIG. 3 is a front view of the auxiliary wheel system and scooter with arms of the auxiliary wheel system in a raised position.
Figure 4:
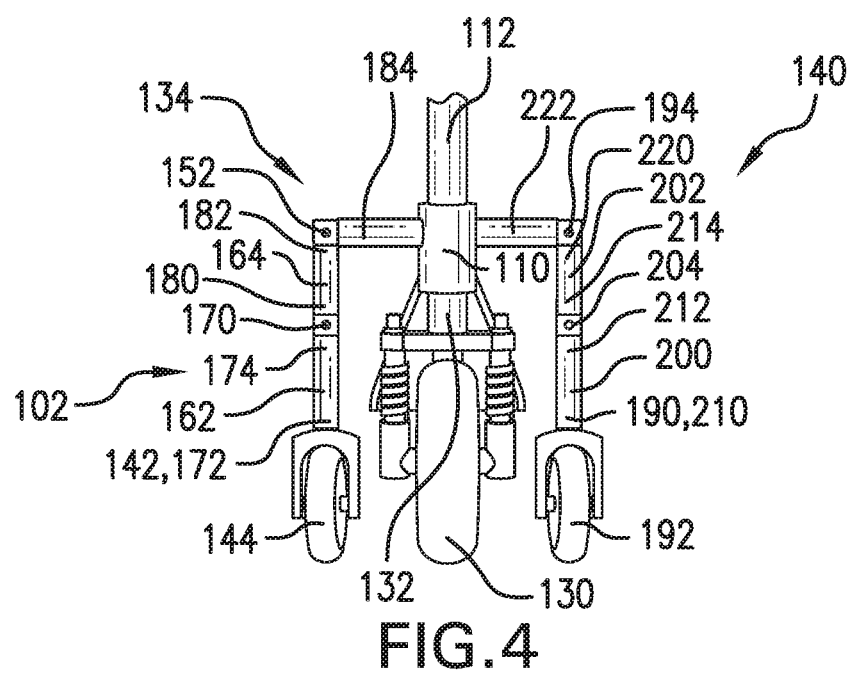
FIG. 4 is a front view of the auxiliary wheel system and scooter with arms of the auxiliary wheel system in a lowered position.

The first arm 134 has a first end 142 fixed to a first auxiliary wheel 144 and a second end 150 pivotally fixed to the frame 104 of the scooter 100 via a first joint 152. As depicted schematically in FIG. 1, a drive assembly 154 including an electric motor 156 and a drive mechanism 158 is operatively connected to the first arm 134, the drive assembly 154 being configured to automatically pivot the first arm 134 about the first joint 152 between a raised position and a lowered position. As depicted in FIGS. 2 and 3, when the first arm 134 is actuated in the raised position and the scooter 100 is oriented in a transport orientation with respect to a ground surface (not shown), the first auxiliary wheel 144 is vertically offset from the ground surface. As depicted in FIG. 4, when the first arm 134 is actuated in the lowered position and the scooter 100 is oriented in the transport orientation, the first auxiliary wheel 144 contacts the ground surface. In an embodiment not shown, the drive assembly 154 actuates at least one of the first arm 134 and the second arm 140 through a wire (i.e., the drive mechanism), such that the drive assembly 154 is disposed on the frame 104 while operatively connected to the first arm 134 and the second arm 140. In an alternative embodiment not shown, the first arm 134 and the second arm 140 are directly motorized.

As depicted in FIGS. 2-4, the first arm 134 is segmented into a first arm portion 162 and a second arm portion 164 by a second joint 170. A first end 172 of the first arm portion 162 is fixed to the first auxiliary wheel 144, and the second joint 170 pivotally fixes the first arm portion 162 and the second arm portion 164 to each other at a second end 174 of the first arm portion 162 and a first end 180 of the second arm portion 164. The first arm 134 is connected to the frame 104 through a second end 182 of the second arm portion 164. As depicted in FIG. 3, the drive assembly 154 is configured to actuate the first arm 134 into the raised position by actuating the second arm portion 164 into the raised position.

A first beam 184 extends laterally from the scooter 100 between the frame 104 and the second end 182 of the second arm portion 164 at the first joint 152. The first beam 184 is disposed adjacent the forward wheel 130 and steering column 112 to share a longitudinal position with the first arm 134, forward wheel 130, and steering column 112. In this manner, the first arm 134 and the first beam 184 are located in front of a portion of the frame 104 configured to accommodate legs of a user such that the first arm 134 and the first beam 184 act as a leg guard for the user regarding objects approaching the scooter 100 from a front-to-back direction.

The second arm 140 is configured similar to the first arm 134. The second arm 140 has a first end 190 fixed to a second auxiliary wheel 192 and a second end 150 pivotally fixed to the frame 104 of the scooter 100 via a third joint 194. The drive assembly 154 is operatively connected to the second arm 140, the drive assembly 154 being configured to pivot the second arm 140 about the third joint 194 between a raised position and a lowered position. As depicted in FIGS. 2 and 3, when the second arm 140 is actuated in the raised position and the scooter 100 is oriented in a transport orientation with respect to the ground surface, the second auxiliary wheel 192 is vertically offset from the ground surface. As depicted in FIG. 4, when the second arm 140 is actuated in the lowered position and the scooter 100 is oriented in the transport orientation, the second auxiliary wheel 192 contacts the ground surface. In an alternative embodiment, a second drive assembly (not shown) is configured to actuate the second arm 140 and the drive assembly 154 is configured to actuate the first arm 134 such that the first arm 134 and the second arm 140 are respectively actuated with separate and drive assemblies.

As depicted in FIGS. 2-4, the second arm 140 is segmented into a third arm portion 200 and a fourth arm portion 202 by a fourth joint 204. A first end 210 of the third arm portion 200 is fixed to the second auxiliary wheel 192, and the fourth joint 204 pivotally fixes the third arm portion 200 and the fourth arm portion 202 to each other at a second end 212 of the third arm portion 200 and a first end 214 of the fourth arm portion 202. The second arm 140 is connected to the frame 104 through a second end 220 of the fourth arm portion 202. As depicted in FIG. 3, the drive assembly 154 is configured to actuate the second arm 140 into the raised position by actuating the fourth arm portion 202 into the raised position.

A second beam 222 extends laterally from the scooter 100 between the frame 104 and the second end 220 of the fourth arm portion 202 at the third joint 194. The second beam 222 is disposed adjacent the forward wheel 130 and steering column 112 to share a longitudinal position with the second arm 140, forward wheel 130, and steering column 112 with respect to the frame 104. In this manner, the second arm 140 and the second beam 222 are located in front of a portion of the frame 104 configured to accommodate legs of a user such that the second arm 140 and the second beam 222 act as a leg guard for the user regarding objects approaching the scooter 100 from the front-to-back direction.

The first joint 152 is configured to selectively lock an angular position of the first arm portion 162 with respect to the second arm portion 164, and the second joint 170 is configured to selectively lock an angular position of the second arm portion 164 with respect to the first beam 184. When each of the first joint 152 and the second joint 170 are in a locked condition, the first arm 134 is rigidly positioned relative to the frame 104. Notably, the auxiliary wheel system 102 is configured to not rely on the drive assembly 154 to maintain a position of the first arm 134 relative to the frame 104 by locking each of the first joint 152 and the second joint 170 after the first arm 134 is actuated by the drive assembly 154.

The third joint 194 is configured to selectively lock an angular position of the third arm portion 200 with respect to the fourth arm portion 202, and the fourth joint 204 is configured to selectively lock an angular position of the fourth arm portion 202 with respect to the second beam 222. When each of the third joint 194 and the fourth joint 204 are in a locked condition, the second arm 140 is rigidly positioned relative to the frame 104. Notably, the auxiliary wheel system 102 is configured to not rely on the drive assembly 154 to maintain a position of the second arm 140 relative to the frame 104 by locking each of the first joint 152 and the second joint 170 after the first arm 134 is actuated by the drive assembly 154.

The first arm 134 and the second arm 140 are each configured to stabilize the frame 104 in the transport orientation such that the frame 104 maintains the transport orientation, including when the scooter 100 is standing still, moving, in transport, acting autonomously, acting under a given direction, has a user riding the scooter 100, and does not have a user riding the scooter 100. To this end, the first arm 134 and the second arm 140 are configured for use as training wheels when the first joint 152 and the second joint 170 lock the first arm 134 in the lowered position and the third joint 194 and the fourth joint 204 lock the second arm 140 in the lowered position. With the first arm 134 and the second arm 140 selectively actuated to the raised position and the lowered position, the auxiliary wheel system 102 is configured to selectively employ the first arm 134 and the second arm 140 as training wheels for the scooter 100.

The first arm 134 and the second arm 140 can be configured for being employed as kickstands by reorienting the frame 104 from a tilted orientation or non-standing orientation to the transport orientation. To this end, when the scooter 100 is in the tilted orientation or the non-standing orientation, one of the first arm 134 and the second arm 140 corresponding to the direction of tilt is actuated toward the lowered position such that the associated auxiliary wheel 144, 192 contacts the ground surface and pushes the frame 104 toward the transport orientation, reorienting the frame 104 into the transport orientation.

Figure 5:
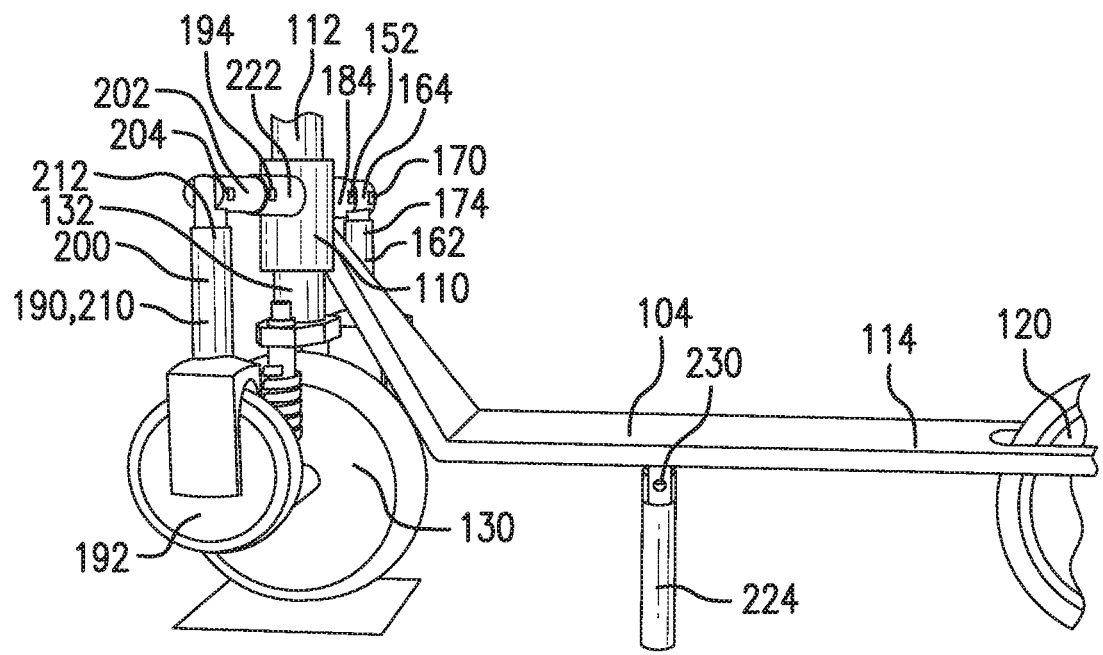
FIG. 5 is a side view of an embodiment of the auxiliary wheel system featuring a kickstand in an extended position.
Figure 6:
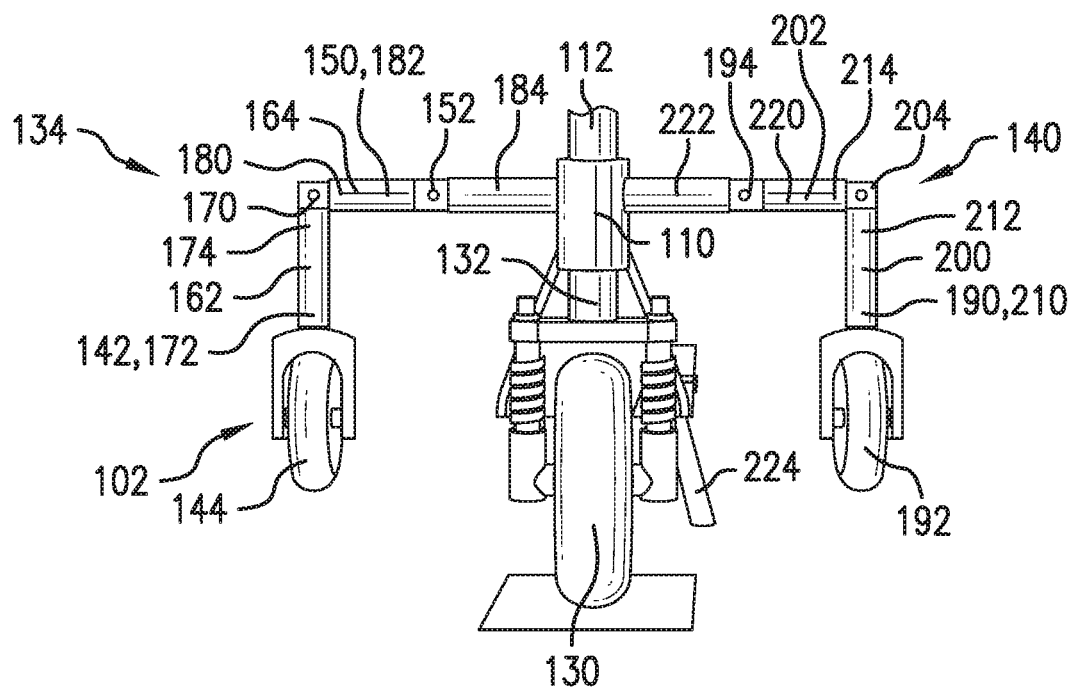
FIG. 6 is a front view of the embodiment of the auxiliary wheel system of FIG. 5 depicting the kickstand in the extended position.

As depicted in FIG. 5, an embodiment of the scooter 100 includes a kickstand 224 pivotally fixed to the frame 104 via a kickstand joint 230. The kickstand 224 is configured to pivot about the kickstand joint 230 relative to the frame 104 between a retracted position and an extended position. The kickstand 224 contacts the ground surface when the frame 104 is in the transport orientation and the kickstand 224 is in the extended position. The kickstand 224 does not contact the ground surface when the frame 104 is in the transport position and the kickstand 224 is in the retracted position. As depicted in FIG. 6, in the extended position the kickstand 224 extends from the frame 104 both vertically and horizontally. According to one aspect, the kickstand 224 is operatively connected to additional machinery such as a motor (not shown) for automated control.

Figure 8:
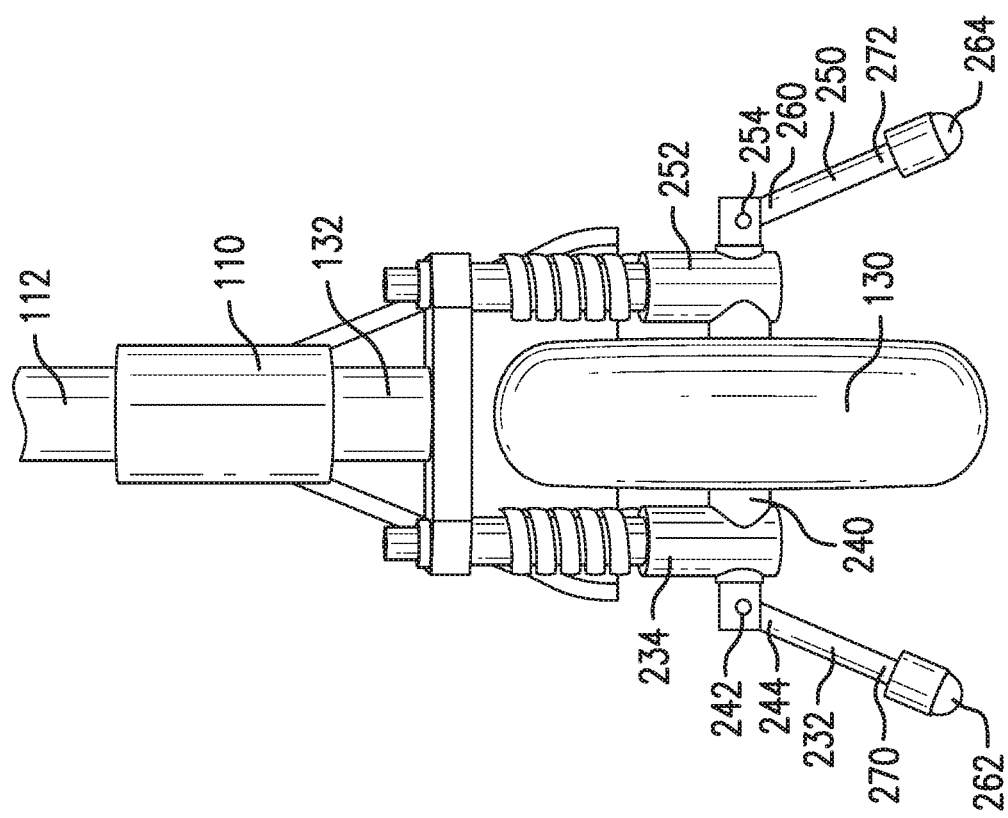
FIG. 8 is a front view of the embodiment of the auxiliary wheel system of FIG. 7 depicting the set of kickstands in an extended position.
Figure 7:
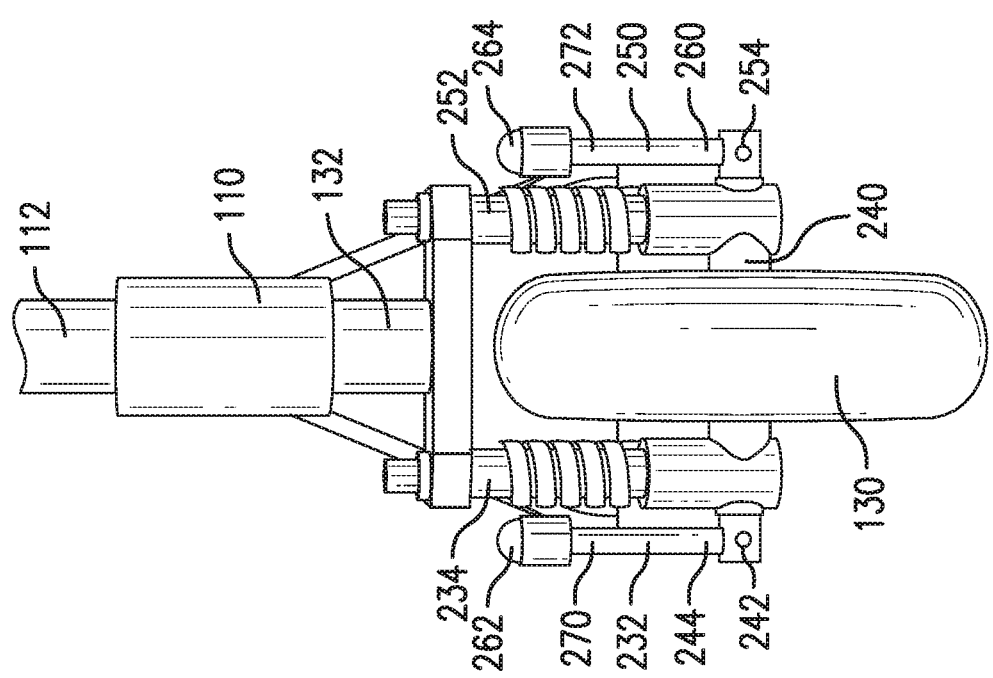
FIG. 7 is a front view of an embodiment of the auxiliary wheel system featuring a set of kickstands according to one aspect in a retracted position.

As depicted in FIGS. 7 and 8, an embodiment of the scooter 100 includes a first kickstand 232 pivotally fixed to a first suspension mechanism 234 at a position aligned with a front wheel axle 240. The first kickstand 232 is fixed to the first suspension mechanism 234 via a first kickstand joint 242 at a first end 244 of the first kickstand 232, and is configured to pivot about the first kickstand joint 242 relative to the first suspension mechanism 234 between a retracted position shown in FIG. 7 and an extended position shown in FIG. 8. The first kickstand 232 contacts the ground surface when the frame 104 is in the transport orientation and the first kickstand 232 is in the extended position. The first kickstand 232 does not contact the ground surface when the frame 104 is in the transport position and the first kickstand 232 is in the retracted position.

The scooter 100 includes a second kickstand 250 configured similar to the first kickstand 232. The second kickstand 250 is pivotally fixed to a second suspension mechanism 252 at a position aligned with the front wheel axle 240. The second kickstand 250 is fixed to the second suspension mechanism 252 via a second kickstand joint 254 at a first end 260 of the second kickstand 250, and is configured to pivot about the second kickstand joint 254 relative to the second suspension mechanism 252 between a retracted position shown in FIG. 7 and an extended position shown in FIG. 8. The second kickstand 250 contacts the ground surface when the frame 104 is in the transport orientation and the second kickstand 250 is in the extended position. The second kickstand 250 does not contact the ground surface when the frame 104 is in the transport orientation and the second kickstand 250 is in the retracted position.

Each of the first kickstand 232 and the second kickstand 250 respectively pivot between the retracted position and the extended position in a lateral direction with respect to the frame 104. In an embodiment, each of the first kickstand 232 and the second kickstand 250 are operatively connected to additional machinery such as at least one motor (not shown) for automated control. As shown in FIG. 7, each of the first kickstand 232 and the second kickstand 250 are respectively disposed in the retracted positions, and to this end the first kickstand 232 and the second kickstand 250 are respectively disposed vertically upwards from the first kickstand joint 242 and the second kickstand joint 254 relative to the ground surface when the frame 104 is in the transport orientation. As shown in FIG. 8, each of the first kickstand 232 and the second kickstand 250 are respectively disposed in the extended positions, and to this end the first kickstand 232 and the second kickstand 250 are respectively disposed in a downward angle relative to the ground surface when the frame 104 is in the transport orientation. By way of example, the first kickstand 232 and the second kickstand 250 can be disposed about 22.5° from a vertical orientation normal to the ground surface when the frame 104 is in the transport orientation and the first kickstand 232 and the second kickstand 250 are respectively disposed in the extended positions.

A first kickstand wheel 262 and a second kickstand wheel 264 are respectively disposed on a second end 270 of the first kickstand 232 and a second end 272 of the second kickstand 250. In this manner, the first kickstand wheel 262 is configured to contact the ground surface when the frame 104 is in the transport orientation and the first kickstand 232 is in the extended position. Also, the second kickstand wheel 264 is configured to contact the ground surface when the frame 104 is in the transport orientation and the second kickstand 250 is in the extended position. Each of the first kickstand wheel 262 and the second kickstand wheel 264 can be a caster wheel configured for accommodating a ground surface running speed of the scooter 100.

Figure 9:
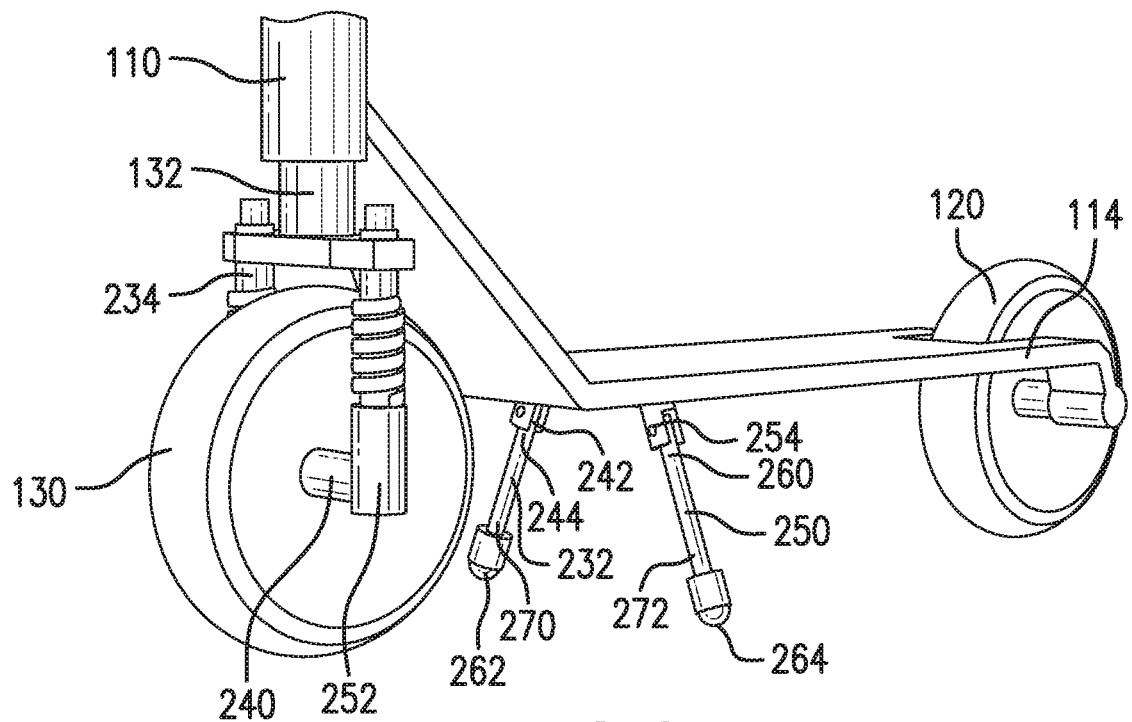
FIG. 9 is a perspective view of an embodiment of the auxiliary wheel system featuring the set of kickstands according to another aspect in the extended position.
Figure 10:
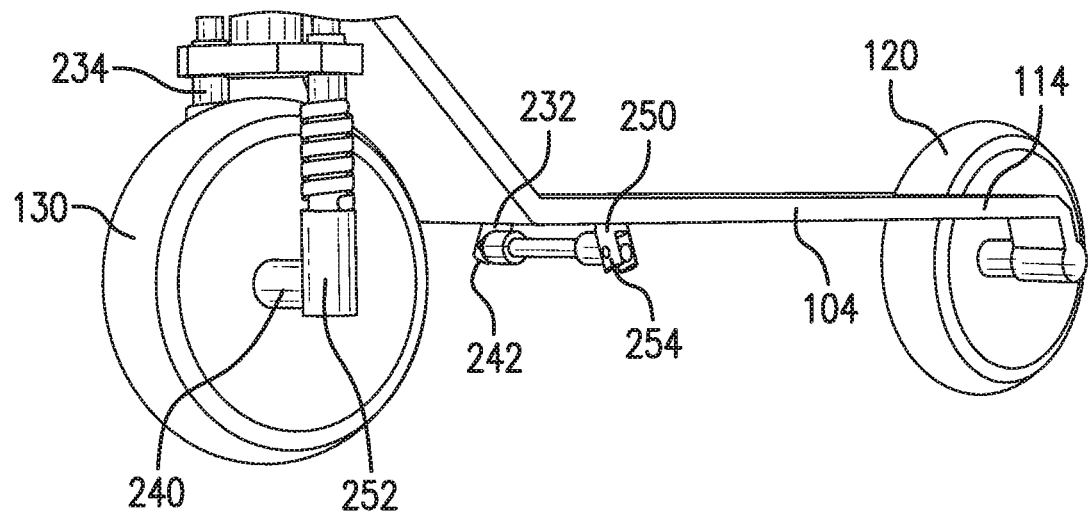
FIG. 10 is a perspective view of the embodiment of the auxiliary wheel system of FIG. 9 depicting the set of kickstands in the retracted position.
Figure 11:
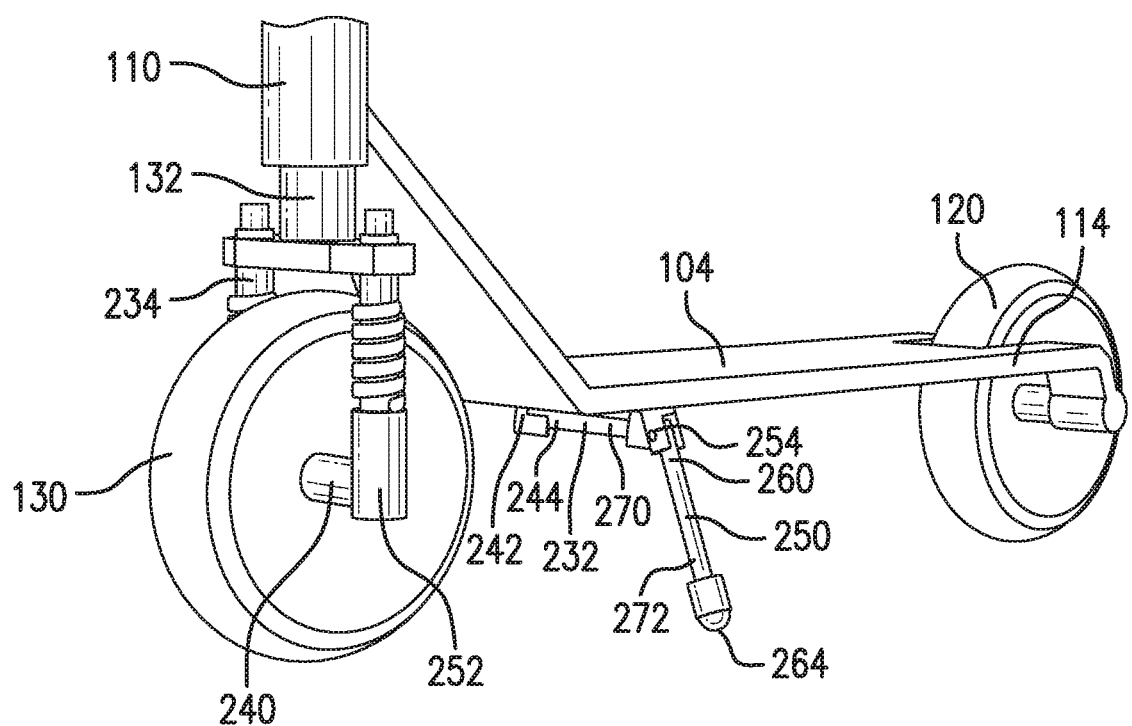
FIG. 11 is a perspective view of the embodiment of the auxiliary wheel system of FIG. 9 depicting one kickstand in the retracted position and one kickstand in the extended position.

In an embodiment of the scooter 100 shown in FIGS. 9-11, each of the first kickstand 232 and the second kickstand 250 are pivotally fixed to the frame 104 via the first kickstand joint 242 and the second kickstand joint 254. In the depicted aspect, each of the first kickstand 232 and the second kickstand 250 can move between the retracted position and the extended position independent of the other of the first kickstand 232 and the second kickstand 250. As shown in FIG. 10, the corresponding retracted positions of the first kickstand 232 and the second kickstand 250 are underneath and laterally across the frame 104. The first kickstand 232 and the second kickstand 250 are mounted to the frame 104 at different longitudinal positions with respect to the frame 104 such that each of the first kickstand 232 and the second kickstand 250 can be in the corresponding retracted position simultaneously without interference from the other of the first kickstand 232 and the second kickstand 250.

The first kickstand 232 and the second kickstand 250 are each configured to stabilize the frame 104 in the transport orientation such that the frame 104 maintains the transport orientation, including when the scooter 100 is standing still, moving, in transport, acting autonomously, acting under a given direction, has a user riding the scooter 100, and does not have a user riding the scooter 100. The first kickstand joint 242 and the second kickstand joint 254 selectively lock the first kickstand 232 and the second kickstand 250 in the corresponding extended positions and retracted positions. To this end, the first kickstand 232 and the second kickstand 250 are configured for selective use as training wheels as shown in FIGS. 9-11.

The first kickstand 232 and the second kickstand 250 are also configured to reorient the frame 104 from a tilted orientation or non-standing orientation to the transport orientation. To this end, when the scooter 100 is in the tilted orientation or the non-standing orientation, one of the first kickstand 232 and the second kickstand 250 corresponding to the direction of tilt is actuated toward the extended position to contact the ground surface and push the frame 104 toward the transport orientation, reorienting the frame 104 into the transport orientation.

As depicted in FIG. 1, an operating environment 274 of the auxiliary wheel system 102 includes a scooter computing device (SCD) 280 with provisions for processing, communicating and interacting with various components of the scooter 100 and other components of the operating environment 274. In an embodiment, the SCD 280 can be implemented with the scooter 100 as depicted in FIG. 1, and in other embodiments the components and functions of the SCD 280 can be implemented remotely from the scooter 100, for example, with a portable device not shown or another device connected via a network 282.

The SCD 280 includes a device memory 284, a device data store 290, and a device communication interface 292, which are each operably connected for computer communication via a bus 294 and/or other wired and wireless technologies. The SCD 280 also includes a device processor 300 operably connected for computer communication via the bus 294 and/or other wired and wireless technologies. The device communication interface 292 provides software and hardware to facilitate data input and output between the components of the SCD 280 and other components, networks, and data sources. Additionally, the device processor 300 includes a data receiving module 302, a determination module 304, and an operation module 310, each suitable for controlling scooter systems 312 using attributes facilitated by the components of the operating environment 274.

The SCD 280 is also operably connected for computer communication (e.g., via the device communication interface 292 and/or the bus 294) to one or more of the scooter systems 312. The scooter systems 312 can include, but are not limited to any automatic or manual systems that can be used to enhance the scooter 100. Here, the scooter systems 312 include a navigation system 314, an orientation system 320, a driving system 322, and a stability system 324 (which can include the drive assembly 154).

The navigation system 314 stores, calculates, and provides route and destination information and facilitates features like mapping and turn-by-turn directions to the SCD 280. In this manner, the navigation system 314 is configured for determining a current position of the scooter 100, and setting a traveling route for the scooter 100 based on the current position of the scooter 100 and the destination information. In some embodiments, the navigation system 314 may provide a user with on-demand maps based on, for example, positioning technology such as satellite navigation (GPS, Galileo, Glonass, etc.) or as some function of Wi-Fi mapping, GSM-based cell signal mapping, RFID tracking, etc.

The orientation system 320 collects, stores, calculates, and provides orientation information of the scooter 100 and facilitates features like determining a degree of tilt of the frame 104 with respect to the transport orientation. Orientation information includes information indicative of the frame 104 having the either tilted orientation, the non-standing orientation, or the transport orientation. Orientation information also includes tilt position and tilt velocity of the frame 104 with respect to the standing position. In this manner, the orientation system 320 facilitates features like determining an angular velocity or acceleration of the frame 104 in terms of tilt with respect to the transport orientation.

The driving system 322 includes the forward wheel 130, the rear wheel 120, and additional machinery such as a motor (not shown) operably connected to at least one of the forward wheel 130 and the rear wheel 120 necessary to propel and steer the scooter 100 in transport. The stability system 324 includes the first arm 134, the second arm 140, the drive assembly 154, the kickstand 224, the first kickstand 232, and the second kickstand 234 as aspects thereof, and is configured for maintaining the frame 104 in the transport orientation, including when the scooter 100 is standing still, moving, in transport, acting autonomously, acting under a given direction, has a user riding the scooter 100, and does not have a user riding the scooter 100. The scooter systems 312 are exemplary in nature and other vehicle systems, as well as more or fewer scooter systems 312 can be implemented with the systems and methods discussed herein.

Referring to FIG. 1, the scooter systems 312 include and/or are operably connected for computer communication to various scooter sensors 330. The scooter sensors 330 provide and/or sense information associated with position, orientation, speed, and use of the scooter 100. The scooter sensors 330 can include, but are not limited to, scooter sensors 330 associated with the scooter systems 312 and other scooter sensors associated with the scooter 100. Specific scooter sensors 330 can include, but are not limited to, scooter speed sensors, accelerometers, GPS sensors, brake sensors, motor sensors, wheel sensors, and steering column sensors, among others. Further, the scooter sensors 330 can include sensors external to the scooter 100 that are accessed, for example, via the network 282, such as external cameras, radar and laser based sensors on other vehicles in a vehicle-to-vehicle network, street cameras, surveillance cameras, and roadway sensors, among others.

The scooter sensors 330 are operable to sense a measurement of data associated with the scooter 100, a scooter environment, the scooter systems 312, and/or users of the scooter 100, and generate a data signal indicating said measurement of data. These data signals can be converted into other data formats (e.g., numerical) and/or used by the scooter systems 312 and/or the SCD 280 to generate other data metrics and parameters. The scooter sensors 330 can be any type of sensor, for example, acoustic, electric, environmental, biomedical, optical, imaging, light, pressure, force, thermal, temperature, proximity, among others. The scooter sensors 330 are exemplary in nature and other scooter sensors, as well as more or fewer scooter sensors 330 can be implemented with the systems and methods discussed herein.

The SCD 280 is also operatively connected for computer communication to the network 282 to at least one remote server 332. The network 282 is, for example, a data network, the Internet, a wide area network or a local area network. The network 282 serves as a communication medium to various devices (e.g., databases, data stores, web servers, remote servers, application servers, intermediary servers, user devices, other portable devices). Data communicated from the SCD 280 in this manner includes, for example, data describing the current position of the scooter 100 and the orientation of the frame 104.

Generally, the remote server 332 includes a remote processor 334, a remote memory 340, remote data 342, and a remote communication interface 344, which are each operably connected to the SCD 280 for computer communication. The connection from the device communication interface 292 to the remote communication interface 344 through the network 282 can be facilitated in various ways. For example, the connection may be made through a network connection (e.g., wired or wireless), a cellular data network from a portable device (not shown) or the remote server 332, a vehicle to vehicle ad-hoc network (not shown), an in-vehicle network (not shown), among others, or any combination of thereof. The remote server 332 may generally provide control data to the SCD 280 and receive control data from the SCD 280. The control data may include operational information about the scooter 100, one or more scooter systems 312, the user, or the remote server 332.

The data receiving module 302 is configured to receive logistical data relating to a route for transporting the scooter 100 from the current position of the scooter 100. The logistical data may include, but is not limited to, at least a portion of the route for the trip, an origin, address, coordinates, point of interest, one or more roadway names, or a waypoint. The logistical data may also include data related to an event, invitation, ticket, or other item associated with a time or location. For example, the logistical data may include a start time, appointment time, a time of departure, and the duration of the trip, among others.

A user may input the logistical data using a portable device (not shown) with an input device such as a keypad, voice recognition, touch screen, etc. In some embodiments, the user may interface with the with the data receiving module 302 using an application. Alternatively, the data receiving module 302 can receive the logistical data from the remote server 332.

The determination module 304 compares an orientation of the frame 104 provided by the orientation system 320 with threshold values to determine whether the frame 104 is in the transport orientation, the tilted orientation, or the non-standing orientation. Specifically, the determination module 304 determines whether a magnitude of tilt, tilt velocity, or tilt acceleration exceeds a corresponding threshold value, the threshold value being determined by the determination module 304 according to maintaining or reorienting the scooter 100 in the transport orientation. In determining the threshold value, the determination module 304 considers information including, but not limited to orientation data, position data, speed data, logistical data, and wheel position data, among others, such that the threshold value facilitates maintaining the frame 104 in the transport orientation through various inclinations as well as transport maneuvers such as banked turning.

The determination module 304 also determines the route based on the logistical data, as well as the next steps of transport while the scooter 100 is caused to drive the route. The determination module 304 determines the next steps of transport according to information including, but not limited to orientation data, position data, speed data, logistical data, wheel position data, and pathway and transport clearance data, among others.

The operation module 310 is configured to cause the scooter 100 to travel a route while maintaining the frame 104 in the transport orientation with the first arm 134 and the second arm 140 in a training wheel function, including actuating the first arm 134 and the second arm 140 in the lowered position automatically when the tilt of the scooter 100 exceeds a threshold. The operation module 310 is also configured to reorient the frame 104 from the tilted orientation or the non-standing orientation in a kickstand function. To this end, the operation module 310 is configured to identify a scooter system 312 attribute determined by the determination module 304 as indicating a tilted or non-standing position of the frame 104 and alter an attribute of the scooter system 312, such as the driving system 322 or the stability system 324, to maintain or reorient the frame 104 in the transport orientation.

Regarding maintaining the frame 104 in a transport orientation, the operation module 310 is configured to cause the scooter 100 to travel the route and monitor the tilt of the frame 104 based on the orientation information provided by the orientation system 320 compared with a threshold value provided by the determination module 304. To this end the operation module 310 automatically actuates at least one of the first arm 134 and the second arm 140 based on the comparison to maintain the frame 104 in the transport orientation when the operation module 310 monitors a tilt measurement of the frame 104 that exceeds the threshold value determined and compared to by the determination module 304. The operation module 310 actuates the drive assembly 154 to pivot at least one of the first arm 134 and the second arm 140 into the lowered position according to whether the frame 104 is tilting toward the first arm 134 or the second arm 140 respectively, thereby stabilizing the orientation of the frame 104.

The operation module 310 is also configured to cause the first arm 134 and the second arm 140 to selectively pivot about the first joint 152 and third joint 194 respectively, between the raised position and the lowered position based on input from a user or the remote server 332. In this manner, the first arm 134 and the second arm 140 are selectively employed as training wheels through the stability system 324.

The kickstand 224 is operatively connected to the operation module 310 and configured for being actuated by the operation module 310 between the retracted position and the extended position in cooperation with other aspects of the stability system 324. In this manner, the operation module 310 causes the kickstand 224 to rotate back about the kickstand joint 230 relative to the frame 104 and into the retracted position when the first arm 134 and the second arm 140 of the stability system 324 are employed as training wheels. Also, the operation module 310 causes the kickstand 224 to rotate out about the kickstand joint 230 relative to the frame 104 and into the extended position for added stability when the scooter 100 is standing still in the transport orientation, aiding or relieving other aspects of the stability system 324.

The first kickstand 232 and the second kickstand 250 are operatively connected to the operation module 310 and configured for being actuated between the retracted position and the extended position. In this manner, the operation module 310 causes the first kickstand 232 and the second kickstand 250 to selectively pivot between the respective retracted positions and extended positions to maintain the frame 104 in the transport orientation. The first kickstand 232 and the second kickstand 250 are configured to maintain the frame 104 in the transport orientation either in cooperation with the stability system 324 or as a standalone feature of the scooter 100.

Regarding the operation module 310 being configured to reorient the frame 104 from the tilted orientation or the non-standing orientation in the kickstand function, the operation module 310 is provided the orientation information of the scooter 100, and in response actuates at least one of the first arm 134, the second arm 140, the kickstand 224, the first kickstand 232, and the second kickstand 250 into the respective lowered position or extended position in order to push the scooter 100 with respect to the ground surface, reorienting the frame 104 into the transport orientation. The operation module 310 is configured to actuate at least one of the first arm 134, the second arm 140, the kickstand 224, the first kickstand 232, and the second kickstand 250 in the kickstand function in response to direct instruction from a user or the remote server 332, or automatically when the determination module 304 determines the frame 104 is not oriented in the transport orientation. In this manner, the first arm 134, the second arm 140, the kickstand 224, the first kickstand 232, and the second kickstand 250 are selectively employed as kickstands through the stability system 324.

To maintain the first arm 134 and the second arm 140 in either the raised position or the lowered position, the operation module 310 locks each of the first joint 152, the second joint 170, the third joint 194, and the fourth joint 204, such that the first arm 134 and the second arm 140 are rigidly positioned with respect to the frame 104 after being actuated into the respective raised position or lowered position. To selectively maintain the kickstand 224, the first kickstand 232, and the second kickstand 250 either in the respective retracted position or extended position, the operation module 310 selectively locks the corresponding kickstand joint 230, first kickstand joint 242, and second kickstand joint 254 such that the kickstand 224, first kickstand 232, and second kickstand 250 are rigidly positioned with respect to the frame 104 after being actuated in the retracted or extended position.

III. Method of Operation

Figure 12:
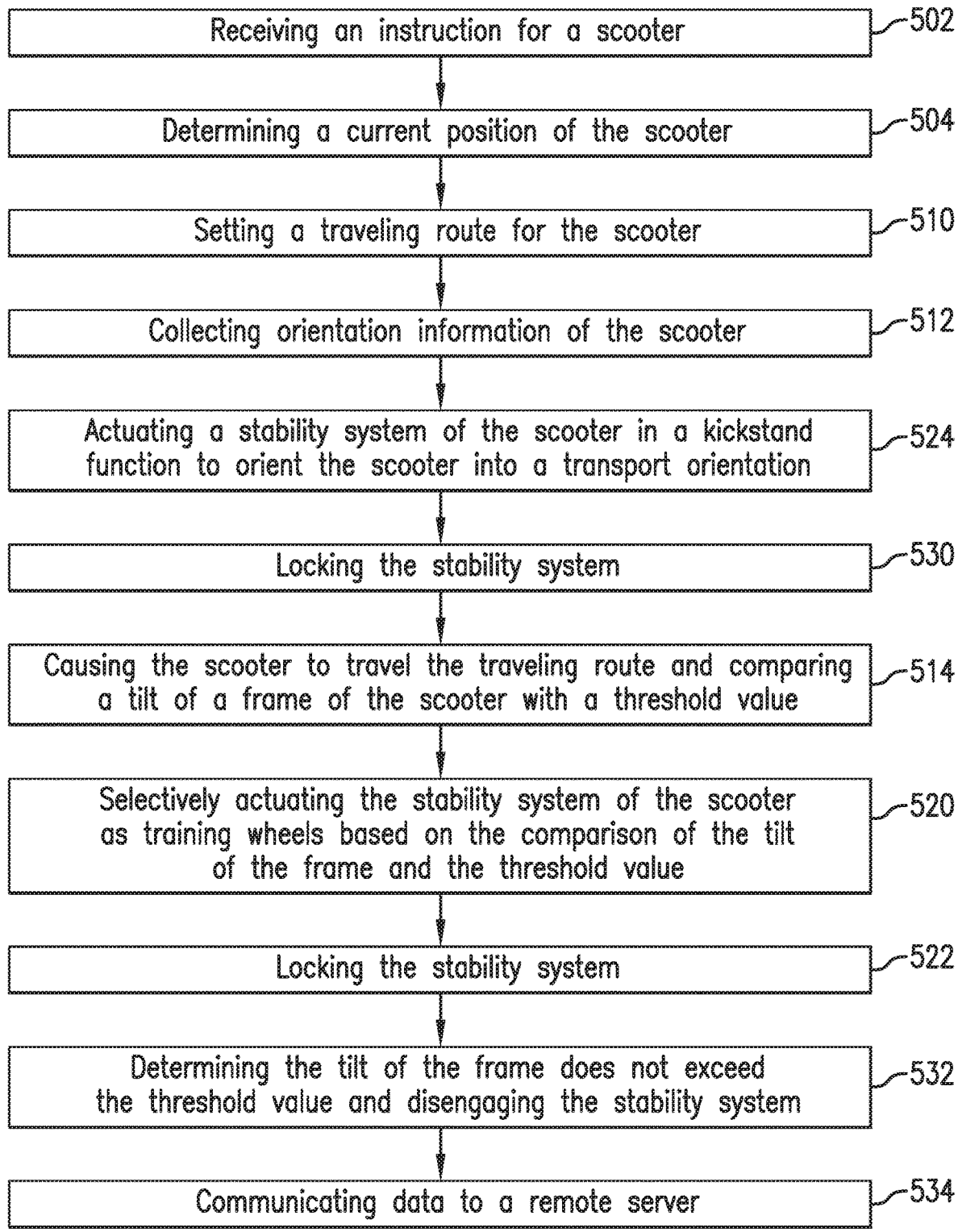
FIG. 12 is a process flow diagram of a method according to an embodiment of the auxiliary wheel system.

As depicted in FIG. 12, a method 500 of operating the auxiliary wheel system 102 includes at block 502 receiving an instruction including a destination for the scooter 100, at block 504 determining a current position of the scooter 100, and at block 510 setting a traveling route for the scooter 100 based on the current position of the scooter 100 and the destination for the scooter 100. At block 512, the method 500 includes collecting orientation information of the scooter 100 describing an orientation of the frame 104 through the orientation system 320, including orientation information indicative of the frame 104 tilting, being in a tilted orientation, or being in a non-standing orientation with respect to the ground surface.

At block 514, the method 500 includes causing the scooter 100 to travel the route and compare a tilt of the frame 104 based on the orientation information with a threshold value through the determination module 304. At block 520, the method 500 includes selectively actuating an aspect of the stability system 324 as training wheels based on the comparison of the tilt of the frame 104 and the threshold value. This step is performed through the operation module 310 to stabilize the orientation of the frame 104 in the transport orientation. At block 522, the method 500 includes locking the stability system 324 including at least one of the first joint 152, the second joint 170, the third joint 194, the fourth joint 204, the first kickstand joint 242, and the second kickstand joint 254 after corresponding aspects of the stability system 324 are actuated such that the corresponding aspects of the stability system 324 are rigid with respect to the frame 104, thereby maintaining the frame 104 in the transport orientation.

To adopt a transport orientation prior to traveling the route, the method 500 includes at block 524 actuating an aspect of the stability system 324 in the kickstand function, reorienting the frame 104 from the tilted orientation or the non-standing orientation. At block 530, the method 500 includes locking the stability system 324 including at least one of the first joint 152, the second joint 170, the third joint 194, the fourth joint 204, the first kickstand joint 242, and the second kickstand joint 254 after the corresponding aspects of the stability system 324 are actuated such that the corresponding aspects of the stability system 324 are rigid with respect to the frame 104, thereby maintaining the frame 104 in the transport orientation.

At block 532 when the auxiliary wheel system 102 determines the tilt of the frame 104 does not exceed a threshold value, the operation module 310 is configured to disengage the stability system 324 to be spaced from the ground surface so as to avoid interfering with unaided scooter 100 transport. At block 534, the method 500 includes communicating data describing at least one of the current position of the scooter 100 and the orientation of the frame 104 to a remote server.

It will be appreciated that various embodiments of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. An auxiliary wheel system for a scooter, the system comprising:
   an auxiliary wheel;
   an arm having a first end fixed to the auxiliary wheel, and a second end pivotally fixed to a frame of the scooter via a first joint attached at the second end, wherein the arm is segmented into a first arm portion and a second arm portion by a second joint, wherein the first arm portion is fixed to the auxiliary wheel, the second joint pivotally fixes the first arm portion and the second arm portion to each other, and the arm is connected to the frame at the first joint through the second arm portion;
   a drive assembly configured to pivot the arm about the first joint between a raised position and a lowered position with respect to the frame wherein the drive assembly actuates the second arm portion into the raised position such that the auxiliary wheel is vertically offset from a ground surface in the raised position;
   an operation module configured to cause the arm to pivot about the joint between the raised position and the lowered position based on a tilt of the frame with respect to the ground surface exceeding a threshold angular value.

2. The auxiliary wheel system of claim 1, further comprising:
   a data receiving module configured to receive an instruction including a destination for the scooter;
   a navigation system configured for determining a current position of the scooter, and setting a traveling route for the scooter based on the current position of the scooter and the destination;
   an orientation system configured for collecting orientation information describing an orientation of the frame, including orientation information indicative of the tilt of the frame; and
   wherein the operation module is configured to cause the scooter to travel the route and compare the tilt of the frame based on the orientation information with the threshold value,
   wherein the operation module actuates the drive assembly based on the comparison.

3. The auxiliary wheel system of claim 1, wherein when the operation module determines the tilt of the frame with respect to the ground surface exceeds the threshold value, the operation module actuates the drive assembly to pivot the arm into the lowered position, stabilizing the orientation of the frame.

4. The auxiliary wheel system of claim 1, wherein the operation module is configured to selectively lock the first joint and the second joint, fixing the arm relative to the frame.

5. The auxiliary wheel system of claim 1, further comprising a kickstand pivotally fixed to the scooter via a kickstand joint, wherein the kickstand is operatively connected to the operation module and configured for being actuated by the operation module between a retracted position and an extended position.

6. The auxiliary wheel system of claim 5, wherein the kickstand is a first kickstand, and the auxiliary wheel system further comprises a second kickstand pivotally fixed to the scooter via a second kickstand joint, the second kickstand being operatively connected to the operation module and configured for being actuated by the operation module between a retracted position and an extended position.

7. The auxiliary wheel system of claim 6, further comprising a first kickstand wheel disposed on an end of the first kickstand that is directed to the ground surface when the first kickstand is in the extended position and the scooter is in a transport orientation, and a second kickstand wheel disposed on an end of the second kickstand that is directed to the ground surface when the second kickstand is in the extended position and the scooter is in the transport orientation.

8. The auxiliary wheel system of claim 1, further comprising a device communication interface configured for communicating data to a remote server, the data relating to at least one of the current position of the scooter and the orientation of the frame relative to the ground surface.

9. The auxiliary wheel system of claim 1, wherein the arm is configured to reorient the frame from a tilted or non-standing orientation to a transport orientation when the drive assembly pivots the arm from the raised position to the lowered position.

10. An auxiliary wheel system for a scooter, wherein the scooter includes a frame having a forward end fixed to a steering column, and the system comprises:
   a beam that extends laterally from the scooter;
   an arm attached to the forward end of the frame through the beam, wherein the beam extends laterally between the frame and the arm and shares a longitudinal position with the arm and the steering column such that the arm, the beam, and the steering column are located in front of a portion of the frame configured to accommodate legs of a user, and act as a leg guard for the user regarding objects approaching the scooter from a front-to-back direction; and
   a drive assembly operatively connected to the arm and configured to actuate the arm between a raised position and a lowered position with respect to the frame based on a comparison of an orientation of the frame with respect to a ground surface with a threshold value.

11. The auxiliary wheel system of claim 10, wherein the arm extends laterally adjacent a forward wheel of the scooter, and the arm is configured to reorient the frame from a tilted or non-standing orientation relative to the ground surface into a transport orientation when the drive assembly actuates the arm from the raised position to the lowered position.

12. The auxiliary wheel system of claim 10, further comprising:
   an auxiliary wheel;
   the arm having a first end fixed to the auxiliary wheel, and a second end pivotally fixed to the frame of the scooter via a joint attached at the second end;
   the drive assembly configured to pivot the arm about the joint between the raised position and the lowered position with respect to the frame;
   wherein the auxiliary wheel and the arm are configured to stabilize the frame in the transport orientation.

13. The auxiliary wheel system of claim 10, further comprising:
   a second arm attached to the frame of the scooter, the second arm having a first end fixed to a second auxiliary wheel, and a second end pivotally fixed to a frame of the scooter via a second joint attached at the second end of the second arm, wherein
   the drive assembly is configured to pivot the second arm about the second joint between a raised position and a lowered position with respect to the frame wherein the second auxiliary wheel is vertically offset from the ground surface and in the lowered position;
   an operation module configured to cause the second arm to pivot about the second joint between the raised position and the lowered position based on a tilt of the frame with respect to a ground surface exceeding a threshold value.

* * * * *